(12) United States Patent
Araki

(10) Patent No.: US 9,475,936 B2
(45) Date of Patent: Oct. 25, 2016

(54) RESIN COMPOSITION AND RESIN MOLDED ARTICLE

(71) Applicant: FUJI XEROX CO., LTD., Tokyo (JP)

(72) Inventor: Yuji Araki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/602,698

(22) Filed: Jan. 22, 2015

(65) Prior Publication Data

US 2016/0060455 A1    Mar. 3, 2016

(30) Foreign Application Priority Data

Sep. 2, 2014  (JP) ................................ 2014-177730

(51) Int. Cl.
    *C08G 18/67*    (2006.01)
    *C08L 69/00*    (2006.01)
    *C08L 67/02*    (2006.01)

(52) U.S. Cl.
CPC ............... *C08L 69/00* (2013.01); *C08L 67/02* (2013.01); *C08L 2201/02* (2013.01); *C08L 2205/025* (2013.01); *C08L 2205/03* (2013.01)

(58) Field of Classification Search
None
See application file for complete search history.

(56) References Cited

U.S. PATENT DOCUMENTS

2011/0230625 A1    9/2011   Kurachi et al.
2012/0022190 A1*   1/2012   Nagano .................. C08L 67/02
                                                 524/114

FOREIGN PATENT DOCUMENTS

JP    2011-195653 A    10/2011
JP    2013-133369 A    7/2013

OTHER PUBLICATIONS

Cheah, K et al., Structure-Property Relationships of Blends of Polycarbonate, Polm. Eng. and Sci. Nov. 2003, 43, 11, p. 1727-1739.*

* cited by examiner

*Primary Examiner* — Susannah Chung
*Assistant Examiner* — Robert T Butcher
(74) *Attorney, Agent, or Firm* — Oliff PLC

(57) ABSTRACT

A resin composition includes a low molecular polycarbonate resin having a weight average molecular weight from 20,000 to 40,000, a high molecular polycarbonate resin having a weight average molecular weight from 50,000 to 70,000, and a polyethylene terephthalate resin having an IV value from 0.5 to 0.8, wherein a weight ratio between a content of the low molecular polycarbonate resin and a content of the high molecular polycarbonate resin is in a range of 30:70 to 70:30.

9 Claims, No Drawings

RESIN COMPOSITION AND RESIN MOLDED ARTICLE

CROSS-REFERENCE TO RELATED APPLICATIONS

This application is based on and claims priority under 35 USC 119 from Japanese Patent Application No. 2014-177730 filed Sep. 2, 2014.

BACKGROUND

1. Technical Field

The present invention relates to a resin composition and a resin molded article.

2. Related Art

In electric products or components of electric and electronic apparatuses, high molecular materials such as polystyrene, a polystyrene-ABS resin copolymer, polycarbonate, polyester, polyphenylene sulfide, and polyacetal are used because of heat resistance, mechanical strength, and the like, and particularly in the case of the components of the electric and electronic apparatuses, high molecular materials are used because of maintainability of the mechanical strength against environmental changes.

Resin compositions containing these high molecular materials and molded articles obtainable by using the resin compositions are reviewed in various ways.

SUMMARY

According to an aspect of the invention, there is provided a resin composition including:

a low molecular polycarbonate resin having a weight average molecular weight from 20,000 to 40,000;

a high molecular polycarbonate resin having a weight average molecular weight from 50,000 to 70,000; and a polyethylene terephthalate resin having an IV value from 0.5 to 0.8, wherein a weight ratio between a content of the low molecular polycarbonate resin and a content of the high molecular polycarbonate resin is in a range of 30:70 to 70:30.

DETAILED DESCRIPTION

Exemplary embodiment of the invention is described as follows. The exemplary embodiment is an example for realizing the invention, and the invention is not limited to the exemplary embodiment.

A resin composition according to the exemplary embodiment of the invention contains a low molecular polycarbonate resin having a weight average molecular weight from 20,000 to 40,000, a high molecular polycarbonate resin having a weight average molecular weight from 50,000 to 70,000, and a polyethylene terephthalate resin having an IV value from 0.5 to 0.8. Also, the weight ratio between a content of the low molecular polycarbonate resin and a content of the high molecular polycarbonate resin is in a range of 30:70 to 70:30. If the resin composition according to the exemplary embodiment contains a low molecular polycarbonate resin having the weight average molecular weight in the aforementioned range and a high molecular polycarbonate resin having the weight average molecular weight in the aforementioned range, and contains the polyethylene terephthalate resin having the IV value in the aforementioned range, a tensile characteristic when being formed to be a molded article is excellent. In addition, the resin composition according to the exemplary embodiment has excellent moldability, and impact resistance and flame retardancy when being formed to be a molded article are excellent.

The inventors of the invention have found that the tensile characteristic when being formed to be a molded article becomes excellent by causing the resin composition containing a polycarbonate resin and a polyethylene terephthalate resin to contain specific ranges of weight average molecular weight of a low molecular polycarbonate resin and a high molecular polycarbonate resin, and to contain the polyethylene terephthalate resin having a specific IV value. In addition, the inventors have found that the resin composition according to the exemplary embodiment has excellent moldability, and impact resistance and flame retardancy when being formed to be a molded article are also excellent. That is, according to the resin composition of the exemplary embodiment, it is possible to obtain the excellent tensile characteristic, and the excellent flame retardancy and moldability in the resin composition containing the polycarbonate resin and the polyethylene terephthalate resin, which are not likely obtained in the related art. According to the constitution, the reason is not clear why the tensile characteristic is excellent so that the tensile elongation increases to a level that is not likely to be expected in the related art, but it is considered that the mechanical characteristics increase as a result of being combined with the polycarbonate resin having different molecular weights, the molecular weight distribution becomes broadened to a wide range, the molecular orientation of the molded article such as an injection-molded product becomes better, and the entanglement of the molecular chain of the resin increases.

Polycarbonate Resin

The resin composition according to the exemplary embodiment includes a low molecular polycarbonate resin having a weight average molecular weight from 20,000 to 40,000, and the high molecular polycarbonate resin having a weight average molecular weight from 50,000 to 70,000, as the polycarbonate resin. The polycarbonate resin is a polyester resin. The tensile characteristic is increased by containing specific compounded amounts of the low molecular polycarbonate resin and the high molecular polycarbonate resin. The polycarbonate resin is not particularly limited as long as the polycarbonate resin is a polymer that is obtainable from polycondensation of one or more monomers and that has at least one carbonate group. For example, an aromatic polycarbonate resin such as bisphenol A-type polycarbonate, bisphenol S-type polycarbonate, and biphenyl-type polycarbonate may be used.

For example, the polycarbonate resin may be an aromatic homopolycarbonate resin or a copolycarbonate resin obtainable by reacting an aromatic bivalent phenol compound and phosgene or carbonic diester. Examples of the aromatic bivalent phenol compound include 2,2-bis(4-hydroxyphenyl) propane, 2,2-bis(4-hydroxy-3,5-dimethylphenyl) propane, bis(4-hydroxyphenyl) methane, 1,1-bis(4-hydroxyphenyl) ethane, 2,2-bis(4-hydroxyphenyl) buthane, 2,2-bis(4-hydroxy-3,5-diphenyl) buthane, 2,2-bis(4-hydroxy-3,5-diethylphenyl) propane, 2,2-bis(4-hydroxy-3,5-diethylphenyl) propane, 1,1-bis(4-hydroxyphenyl) cyclohexane, and 1-phenyl-1,1-bis(4-hydroxyphenyl) ethane, and these may be used singly or by mixture.

As the polycarbonate resin, a synthetic product may be used, and a commercial product may be used. Examples of the commercial product include "L-1250Y" and "AD5503" manufactured by Teijin Limited, "A2200" manufactured by Idemitsu Kosan Co., Ltd., and "Iupilon 52000" (aromatic polycarbonate resin) manufactured by Mitsubishi Engineering-Plastics Corporation. In addition, the polycarbonate resins are used singly, or two or more types thereof may be used in combination.

In addition, the polycarbonate resin may be a market recovered material recovered from a market, and the polycarbonate resin may contain a recycled material such as a waste disk like waste CD and a waste bottle like a gallon bottle of a water server.

The weight average molecular weight of the low molecular polycarbonate resin is in a range of 20,000 to 40,000, and is preferably in a range of 25,000 to 35,000. If the weight average molecular weight of the low molecular polycarbonate resin is less than 20,000, flame retardancy and impact resistance when being formed to be a molded article may decrease, and if the weight average molecular weight exceeds 40,000, the moldability may decrease so that the tensile characteristic when being formed to be a molded article may decrease.

The weight average molecular weight of the high molecular polycarbonate resin is in a range of 50,000 to 70,000, and preferably in a range of 55,000 to 65,000. If the weight average molecular weight of the high molecular polycarbonate resin is less than 50,000, the tensile characteristic, the flame retardancy, and the impact resistance when being formed to be a molded article may decrease, and if the weight average molecular weight exceeds 70,000, the moldability may decrease so that the tensile characteristic when being formed to be a molded article may decrease.

The weight ratio between the content of the low molecular polycarbonate resin and the content of the high molecular polycarbonate resin is in a range of 30:70 to 70:30, and preferably in a range of 40:60 to 60:40. If the weight ratio between the content of the low molecular polycarbonate resin and the content of the high molecular polycarbonate resin is less than 30:70, the moldability may decrease so that the tensile characteristic when being formed to be a molded article may decrease, and if the weight ratio exceeds 70:30, the tensile characteristic, the flame retardancy, and the impact resistance when being formed to be a molded article may decrease.

Polyethylene Terephthalate Resin

The polyethylene terephthalate resin is a polyester resin. Since the polyethylene terephthalate resin is a resin having excellent mechanical strength, heat resistance, and chemical resistance, the polyethylene terephthalate resin is widely used as a material of a film, a fiber, or a container. For the use in a field of electricity, automobiles, architecture, and the like, flame retardancy of the polyethylene terephthalate resin is required.

For example, the polyethylene terephthalate resin may be obtained by dehydration condensation of ethylene glycol and terephthalate.

As the polyethylene terephthalate resin, a synthetic product may be used, and a commercial product may be used. Examples of the commercial product include "J125" manufactured by Mitsui Chemicals, Inc. and "TRN-8550FF" manufactured by Teijin Limited.

The polyethylene terephthalate resin may be a market recovered material recovered from a market, or may contain a recycled material such as a polyethylene terephthalate bottle (PET bottle) and a polyethylene terephthalate film (PET film).

The intrinsic viscosity (IV) value which is an index indicating a molecular weight of the polyethylene terephthalate resin is in a range of 0.5 to 0.8, and preferably in a range of 0.6 to 0.7. If the IV value of the polyethylene terephthalate resin is less than 0.5, the flame retardancy and the impact resistance when being formed to be a molded article may decrease, and if the IV value exceeds 0.8, the moldability decreases.

The weight ratio between the content of the polyethylene terephthalate resin and the sum of the content of the low molecular polycarbonate resin and the content of the high molecular polycarbonate resin is preferably in a range of 60:40 to 90:10, and more preferably in a range of 70:30 to 85:15. If the weight ratio between the content of the polyethylene terephthalate resin and the sum of the content of the low molecular polycarbonate resin and the content of the high molecular polycarbonate resin is less than 60:40, the flame retardancy and impact resistance when being formed to be a molded article may decrease, and if the weight ratio exceeds 90:10, the moldability may decrease so that the tensile characteristic when being formed to be a molded article may decrease.

Flame Retardant

The resin composition according to the exemplary embodiment may contain a flame retardant. The flame retardancy increases when being formed to be a molded article by containing the flame retardant. Flame retardants generally used as the flame retardant of a polymer may be used, and the flame retardant is not particularly limited. For example, an inorganic flame retardant or an organic flame retardant is used, and the flame retardant is not particularly limited. For example, the flame retardant is preferably at least one selected from the group consisting of a borate flame retardant, an ammoniacal flame retardant, other inorganic flame retardants, a nitrogen flame retardant, other organic flame retardants, and a colloidal flame retardant. Examples of the borate flame retardant include compounds containing borate such as zinc borate hydrate, barium metaborate, and borax. Examples of the ammoniacal flame retardant include an ammonia compound such as ammonium sulfate. Examples of the other inorganic flame retardants include an iron oxide combustion catalyst such as ferrocene, a compound containing titanium such as titanium oxide, a guanidine compound such as guanidine sulfamate, a zirconium compound, a molybdenum compound, a tin compound, a carbonate compound such as potassium carbonate, and metal hydroxide compound such as aluminium hydroxide and magnesium hydroxide, and modified materials thereof. Examples of the nitrogen flame retardant include a cyanurate compound having a triazine ring. Examples of the other organic flame retardant include a compound containing chlorendic anhydride, phthalic anhydride, and bisphenol A, a glycidyl. compound such as glycidyl ether, polyol such as diethylene glycol and pentaerythritol, modified carbamide, and a silicone compound such as silicone oil and organosiloxane. Examples of the colloidal flame retardant include colloids of a metal hydroxide compound such as aluminium hydroxide, magnesium hydroxide, and calcium hydroxide, hydrates such as calcium aluminate, dihydrate gypsum, zinc borate, barium metaborate, borax, and kaolin clay, a nitrate compound such as sodium nitrate, a molybdenum compound, a zirconium compound, and an antimony compound, and a flame retardant compound such as dawsonite and phlogopite, which have flame retardancy used in the related art. In addition, a phosphate compound and a phosphate ester compound are included.

In view of moldability and environmental conservation, as a flame retardant, a phosphate ester compound is preferable. As the phosphate ester compound, ester compounds of phosphorous acid, phosphoric acid, phosphonous acid, and phosphonic acid are used. Specific examples of phosphorous acid ester include triphenyl phosphite, tris(nonylphenyl)phosphite, tris(2,4-di-t-butylphenyl)phosphite, distearyl pentaerythritol diphosphite, bis(2,6-di-t-butyl-4-methylphenyl)pentaerythritol diphosphate, and bis(2,4-di-t-butylphenyl)pentaerythritol diphosphite. Specific examples of phosphate ester include triphenyl phosphate (TPP), tris (nonylphenyl)phosphate, tris(2,4-di-t-butylphenyl) phosphate, distearyl pentaerythritol diphosphate, bis(2,6-di-t-butyl-4-methylphenyl)pentaerythritol diphosphate, bis(2,4-di-t-butylphenyl)pentaerythritol diphosphate, tributylphosphate, and bisphenol A bis-diphenylphosphate. Specific examples of phosphonous acid ester include tetrakis (2,4-di-t-butylphenyl)-4,4'-biphenylene phosphonite. Specific examples of phosphonic acid include dimethyl benzenephosphonate and benzenephosphonate ester.

As the flame retardant, a synthetic product may be used, and a commercial product may be used. In addition, the flame retardants may be used singly, or two or more types thereof may be used in combination.

The content of the flame retardant is not particularly limited, but preferably from 5% by weight to 100% by weight, and more preferably from 10% by weight to 50% by weight with respect to the total amount of solid content of the resin composition. If the content of the other flame retardant is less than 5% by weight, sufficient flame retardancy may not be obtained, and if the content exceeds 100% by weight, the mechanical characteristic when being formed to be a molded article may decrease.

Other Additives

As the additives other than the flame retardant, an antioxidant, a filler, a drip preventing agent, and the like may be used, if necessary. The respective contents of the other components are preferably less than 10% by weight, with respect to the total amount of solid content of the resin composition.

Examples of the antioxidant include phenol, amine, phosphorus, sulfur, hydroquinone, and quinoline antioxidants. The antioxidants may be used singly, or two or more types thereof may be used in combination.

Examples of the filler include clay such as kaolin clay, bentonite clay, kibushi clay, and gairome clay, talc, mica, and montmorillonite. The fillers may be used singly, or two or more types thereof may be used in combination.

The drip preventing (melt dripping) property when being formed to be a molded article is enhanced by containing the drip preventing agent. As the drip preventing agent, a synthetic product may be used, and a commercial product may be used. Examples of the commercial product include "PTFE CD145" manufactured by Asahi Glass Co., Ltd., and "FA500H" manufactured by Daikin Industries, Ltd., which are polytetrafluoroethylene. The drip preventing agents may be used singly, or two or more types thereof may be used in combination.

Various Measuring Methods

The contents of the low molecular polycarbonate resin, the high molecular polycarbonate resin, and the polyethylene terephthalate resin in the resin composition are measured by $^1$H-NMR analysis. Contents of the low molecular polycarbonate resin, the high molecular polycarbonate resin, the polyethylene terephthalate resin in a resin molded article obtainable by using the resin composition are measured by $^1$H-NMR analysis. From the contents of the low molecular polycarbonate resin, the high molecular polycarbonate resin, and the polyethylene terephthalate resin in the resin molded article measured in this manner, the contents of the low molecular polycarbonate resin, the high molecular polycarbonate resin, and the polyethylene terephthalate resin in the resin composition are estimated.

With respect to weight average molecular weights of the low molecular polycarbonate resin and the high molecular polycarbonate resin in the resin composition, high molecules are dissolved in a solvent, and the solution is subjected to the size exclusion chromatography (GPC) to obtain the weight average molecular weights. Tetrahydrofuran (THF) is dissolved and analysis is conducted by the molecular weight distribution measurement (GPC). With respect to the weight average molecular weights of the low molecular polycarbonate resin and the high molecular polycarbonate resin in the resin molded article obtainable by using the resin composition, high molecules are dissolved in a solvent, and the solution is subjected to the size exclusion chromatography (GPC) to obtain the weight average molecular weights. Tetrahydrofuran (THF) is dissolved and analysis is conducted by the molecular weight distribution measurement (GPC).

The glass transition temperatures of the low molecular polycarbonate resin and the high molecular polycarbonate resin in the resin composition are measured in a method of JZS K 7121 using a thermal analysis apparatus (DSC 6000 manufactured by SII NanoTechnology Inc.). The glass transition temperatures of the low molecular polycarbonate resin and the high molecular polycarbonate resin in the resin molded article obtainable by using the resin composition are measured in a method of JIS K 7121 using a thermal analysis apparatus (DSC 6000 manufactured by SII NanoTechnology Inc.).

The TV value of the polyethylene terephthalate resin in the resin composition is measured by using a capillary viscometer (Ubbelohde manufactured by LAUDA) according to "JIS K7390 testing methods for reclaimed polyethylene terephthalate (PET) molding materials". The IV value of the polyethylene terephthalate resin in the resin molded article obtainable by using the resin composition is measured by using the capillary viscometer (Ubbelohde manufactured by LAUDA) according to "JIS K7390 testing methods for reclaimed polyethylene terephthalate (PET) molding materials".

With respect to the resin composition and the resin molded article obtainable by using the resin composition, the contents of the flame retardants and the other additives in the resin composition and the resin molded article are measured by measuring structures and composition ratios of respective materials by using an element analysis apparatus, an NMR apparatus, an IR apparatus, and the like. In addition, the contents of the flame retardant and the other additives in the resin composition are estimated from the contents of the flame retardant and the other additives in the resin molded article.

Method of Preparing Resin Composition

For example, the resin composition according to the exemplary embodiment may be prepared by kneading the low molecular polycarbonate resin, the high molecular polycarbonate resin, the polyethylene terephthalate resin, and, if necessary, other components such as flame retardants.

Kneading may be conducted with a well-known kneader such as a twin screw kneader (TEM58SS manufactured by Toshiba Machine Co., Ltd.) or a simple kneader (Labo Plastomill manufactured by Toyo Seiki Seisaku-Sho, Ltd.). Here, a temperature condition of the kneading (cylinder temperature condition) is, for example, preferably in a range of 250° C. to 300° C., and more preferably in a range of 260° C. to 280° C. Accordingly, a molded article having an excellent tensile characteristic may be easily obtained.

Resin Molded Article

The resin molded article according to the exemplary embodiment may be obtained by molding the resin composition according to the exemplary embodiment described above, for example.

The resin molded article according to the exemplary embodiment may be obtained by molding the resin composition by injection molding, extrusion molding, blow molding, hot press molding, and the like. For productivity reasons, the resin molded article is preferably obtained by injection-molding the resin composition according to the exemplary embodiment.

The injection molding may be conducted by using a commercially available apparatuses such as "NEX 150" and "NEX 70000" manufactured by Nissei Plastic Industrial Co., Ltd., and "SE50D" manufactured by Toshiba Machine Co., Ltd. At this point, in view of the prevention of the decomposition of the resin, the cylinder temperature is preferably in a range of 250° C. to 300° C., and more preferably in a range of 260° C. to 280° C. In addition, in view of productivity and the like, the mold temperature is preferably in a range of 40° C. to 100° C., and more preferably in a range of 60° C. to 80° C.

The resin molded article according to the exemplary embodiment has an excellent tensile characteristic. In addition, the resin molded article according to the exemplary embodiment has excellent impact resistance, flame retardancy, and the like.

Components of Electric and Electronic Apparatuses

Since the resin molded article according to the exemplary embodiment has excellent mechanical strength (impact resistance, tensile elasticity, and the like), the resin molded article is appropriately used for electric and electronic apparatuses, home appliances, containers, automobile interior materials, and the like. More specifically, examples of the use include housings, various kinds of components, and the like of home appliances or electric and electronic apparatuses, wrapping films, storage cases such as for CD-ROM or DVD, tableware, food trays, bottles for beverages, and medicine wrapping materials, and among them, the resin molded article is appropriately used for electric and electronic apparatuses. Since many components of the electric and electronic apparatuses have complicated shapes and are heavy objects, the components require higher impact resistance than components which are not heavy objects. However, according to the resin molded article of the exemplary embodiment, such requirements are sufficiently satisfied. The resin molded article according to the exemplary embodiment is appropriately used, particularly, in housings of an image forming apparatus, a copying machine, or the like.

Example

The invention is described in detail with reference to examples and comparative examples. However, the invention is not limited to the examples described below.

Examples and Comparative Examples

Raw materials in compositions (parts by weight) presented in Tables 1 and 2 is mixed, put into the twin screw kneader (TEM58SS manufactured by Toshiba Machine Co., Ltd.), and kneaded at the cylinder temperature of 260° C., to obtain resin compositions (compounds). Subsequently, the obtained resin composition is molded at a cylinder temperature of 260° C., and a mold temperature of 60° C. in an injection molding apparatus (NEX 150E manufactured by Nissei Plastic Industrial Co., Ltd.) to obtain the test piece. Table 3 presents product names and brand names of the respective components presented in Tables 1 and 2.

Evaluation Method

Tension Test (Tensile Characteristic Evaluation)

A tensile elongation at break of an ISO multipurpose dumbbell test piece (test piece JIS1, thickness: 4 mm) is measured in conformity with JIS K-7113. The value of 15% or greater is considered to be good. The results are presented in Tables 1 and 2.

Flame Retardancy

The V test regulated in UL 94 is conducted with a test piece having thickness of 2.0 mm. In addition, results of combustion tests are high levels in a sequence of 5VB, V-0, V-1, V-2, and V-not. The evaluation is conducted with standards presented below. The results are presented in Tables 1 and 2.

A: 5VB or greater
B: V-0
C: V-1 or less

Impact strength (impact resistance evaluation)

Charpy impact strength ($kJ/m^2$) is measured with an impact resistance testing apparatus (DG-5 manufactured by Toyo Seiki Seisaku-Sho, Ltd.) according to the method regulated in ISO-179 by using a notch processed ISO multipurpose dumbbell test piece. The evaluation is conducted with standards presented below.

The results are presented in Tables 1 and 2.

A: 10 or greater
B: 2 or greater and less than 10
C: Less than 2

Evaluation of Moldability

The resin composition is dried at 100° C. for 4 hours, and flow lengths of a fluid test piece (channel thickness: 2 mm, channel width: 10 mm) are evaluated in the standards presented below by using the injection molding apparatus (NEX 150E manufactured by Nissei Plastic Industrial Co., Ltd.). The condition is a cylinder temperature of 260° C., a molding temperature of 60° C., and an injection pressure of 50 MPa. As the flow length is greater, the fluidity is better. The evaluation is conducted with standards presented below. The results are presented in Tables 1 and 2.

A: 300 mm or greater
B: 150 mm or greater and less than 300 mm
C: Less than 150 mm

TABLE 1

|  |  | Example 1 | Example 2 | Example 3 | Example 4 | Example 5 | Example 6 | Example 7 | Example 8 |
|---|---|---|---|---|---|---|---|---|---|
| Low molecular PC resin | A1 |  |  |  |  |  |  |  |  |
|  | A2 | 42 | 35 | 21 | 54 | 45 | 36 | 36 | 30 |
|  | A3 |  |  |  |  |  |  |  |  |
|  | A4 |  |  |  |  |  |  |  |  |
|  | A5 |  |  |  |  |  |  |  |  |
|  | A6 |  |  |  |  |  |  |  |  |

TABLE 1-continued

| | | | | | | | | | |
|---|---|---|---|---|---|---|---|---|---|
| High molecular PC resin | B1 | | | | | | | | |
| | B2 | 21 | 35 | 42 | 36 | 45 | 54 | 24 | 30 |
| | B3 | | | | | | | | |
| | B4 | | | | | | | | |
| | B5 | | | | | | | | |
| | B6 | | | | | | | | |
| PET resin | C1 | | | | | | | | |
| | C2 | 30 | 30 | 30 | 10 | 10 | 10 | 40 | 40 |
| | C3 | | | | | | | | |
| | C4 | | | | | | | | |
| | C5 | | | | | | | | |
| | C6 | | | | | | | | |
| Flame retardant | D1 | 15 | 15 | 15 | 15 | 15 | 15 | 15 | 15 |
| Drip preventing agent | E1 | 1 | 1 | 1 | 1 | 1 | 1 | 1 | 1 |
| Antioxidant | F1 | 0.2 | 0.2 | 0.2 | 0.2 | 0.2 | 0.2 | 0.2 | 0.2 |
| Tensile characteristic | | 30 | 64 | 30 | 20 | 50 | 20 | 40 | 59 |
| Flame retardancy | | B | B | A | A | A | A | B | B |
| Moldability | | A | A | B | B | B | B | A | A |
| Charpy impact strength | | B | B | B | B | B | B | B | B |

| | | Example 9 | Example 10 | Example 11 | Example 12 | Example 13 | Example 14 | Example 15 |
|---|---|---|---|---|---|---|---|---|
| Low molecular PC resin | A1 | | 42 | 35 | 21 | 54 | | |
| | A2 | 24 | | | | | 48 | 25 |
| | A3 | | | | | | | |
| | A4 | | | | | | | |
| | A5 | | | | | | | |
| | A6 | | | | | | | |
| High molecular PC resin | B1 | | 21 | 35 | 42 | 36 | | |
| | B2 | 36 | | | | | 48 | 25 |
| | B3 | | | | | | | |
| | B4 | | | | | | | |
| | B5 | | | | | | | |
| | B6 | | | | | | | |
| PET resin | C1 | | 30 | 30 | 30 | 10 | | |
| | C2 | 40 | | | | | 4 | 50 |
| | C3 | | | | | | | |
| | C4 | | | | | | | |
| | C5 | | | | | | | |
| | C6 | | | | | | | |
| Flame retardant | D1 | 15 | 15 | 15 | 15 | 15 | 15 | 15 |
| Drip preventing agent | E1 | 1 | 1 | 1 | 1 | 1 | 1 | 1 |
| Antioxidant | F1 | 0.2 | 0.2 | 0.2 | 0.2 | 0.2 | 0.2 | 0.2 |
| Tensile characteristic | | 40 | 25 | 51 | 26 | 25 | 75 | 70 |
| Flame retardancy | | B | B | B | A | B | A | B |
| Moldability | | A | A | A | B | B | B | A |
| Charpy impact strength | | B | B | B | B | A | A | B |

TABLE 2

| | | Example 16 | Example 17 | Example 18 | Example 19 | Example 20 | Example 21 | Comparative Example 1 | Comparative Example 2 |
|---|---|---|---|---|---|---|---|---|---|
| Low molecular PC resin | A1 | | | | 35 | 35 | 35 | 35 | 63 | 7 |
| | A2 | | | | | | | | | |
| | A3 | 35 | | | | | | | | |
| | A4 | | 35 | | | | | | | |
| | A5 | | | | | | | | | |
| | A6 | | | | | | | | | |
| High molecular PC resin | B1 | 35 | 35 | | | | 35 | 35 | 7 | 63 |
| | B2 | | | | | | | | | |
| | B3 | | | 35 | | | | | | |
| | B4 | | | | 35 | | | | | |
| | B5 | | | | | | | | | |
| | B6 | | | | | | | | | |
| PET resin | C1 | 30 | 30 | 30 | 30 | | | 30 | 30 |
| | C2 | | | | | | | | | |
| | C3 | | | | | 30 | | | | |
| | C4 | | | | | | 30 | | | |
| | C5 | | | | | | | | | |
| | C6 | | | | | | | | | |
| Flame retardant | D1 | 15 | 15 | 15 | 15 | 15 | 15 | 15 | 15 |
| Drip preventing agent | E1 | 1 | 1 | 1 | 1 | 1 | 1 | 1 | 1 |
| Antioxidant | F1 | 0.2 | 0.2 | 0.2 | 0.2 | 0.2 | 0.2 | 0.2 | 0.2 |
| Tensile characteristic | | 49 | 35 | 50 | 47 | 67 | 38 | 5 | 10 |
| Flame retardancy | | B | B | B | B | B | B | C | B |

TABLE 2-continued

| | | | | | | | | |
|---|---|---|---|---|---|---|---|---|
| Moldability | B | A | B | A | B | A | B | C |
| Charpy impact strength | B | B | B | B | B | B | C | B |

| | | | Comparative Example 3 | Comparative Example 4 | Comparative Example 5 | Comparative Example 6 | Comparative Example 7 | Comparative Example 8 |
|---|---|---|---|---|---|---|---|---|
| Low molecular PC resin | A1 | | | | 35 | 35 | 35 | 35 |
| | A2 | | | | | | | |
| | A3 | | | | | | | |
| | A4 | | | | | | | |
| | A5 | | 35 | | | | | |
| | A6 | | | 35 | | | | |
| High molecular PC resin | B1 | | 35 | 35 | | | 35 | 35 |
| | B2 | | | | | | | |
| | B3 | | | | | | | |
| | B4 | | | | | | | |
| | B5 | | | | 35 | | | |
| | B6 | | | | | 35 | | |
| PET resin | C1 | | 30 | 30 | 30 | 30 | | |
| | C2 | | | | | | | |
| | C3 | | | | | | | |
| | C4 | | | | | | | |
| | C5 | | | | | | 30 | |
| | C6 | | | | | | | 30 |
| Flame retardant | D1 | | 15 | 15 | 15 | 15 | 15 | 15 |
| Drip preventing agent | E1 | | 1 | 1 | 1 | 1 | 1 | 1 |
| Antioxidant | F1 | | 0.2 | 0.2 | 0.2 | 0.2 | 0.2 | 0.2 |
| Tensile characteristic | | | 18 | 30 | 60 | 10 | 68 | 38 |
| Flame retardancy | | | B | C | B | C | B | C |
| Moldability | | | C | A | C | A | C | A |
| Charpy impact strength | | | B | B | B | C | B | B |

TABLE 3

| | | Product Name | Brand, Origin | Remark |
|---|---|---|---|---|
| Low molecular PC resin | A1 | L1225LL | Tejin | Mw = 29000 |
| | A2 | LK 62 (CD recycled grade) | Luen Kee Plastic | Mw = 29000 |
| | A3 | L1225L | Tejin | Mw = 40000 |
| | A4 | 301-40 | Sumika Styron | Mw = 21000 |
| | A5 | L1225 | Tejin | Mw = 46000 |
| | A6 | Product obtained by regrinding L1225LL twice | — | Mw = 17000 |
| High molecular PC resin | B1 | IB2500 | Idemitsu | Mw = 58000 |
| | B2 | LK77 (water bottle recycled grade) | Luen Kee Plastic | Mw = 54000 |
| | B3 | 301-6 | Sumika Styron | Mw = 69000 |
| | B4 | L1250 | Tejin | Mw = 50000 |
| | B5 | 301-4 | Sumika Styron | Mw = 74000 |
| | B6 | L1225 | Tejin | Mw = 46000 |
| PET resin | C1 | J125 | Mitsui Chemicals | IV = 0.71 |
| | C2 | PET bottle recycled grade | Kyoei Sangyo | IV = 0.66 |
| | C3 | J135 | Mitsui Chemicals | IV = 0.80 |
| | C4 | Grade for fibers (PET film recycled) | Utsumi Recycle Systems | IV = 0.55 |
| | C5 | J055 | Mitsui Chemicals | IV = 1.1 |
| | C6 | Product obtained by regrinding PET bottle recycled grade once | — | IV = 0.41 |
| Flame retardant | D1 | CR741 | Daihachi Chemical industry | Condensed phosphate ester |
| Drip preventing agent | E1 | A-3750 | Mitsubishi Rayon | PTFE |
| Antioxidant | F1 | Irganox 1076 | Ciba Japan | Phenol material |

As presented above, the resin compositions of examples have excellent tensile characteristics when being formed to be a molded article compared with the resin compositions of comparative examples. In addition, the resin compositions of Examples 1 to 13 have excellent moldability, and thus tensile characteristic, impact resistance, and flame retardancy when being formed to be a molded article are excellent.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. A resin composition comprising:
a low molecular weight polycarbonate resin having a weight average molecular weight from 20,000 to 40,000;

a high molecular weight polycarbonate resin having a weight average molecular weight from 50,000 to 70,000; and a polyethylene terephthalate resin having an intrinsic viscosity value from 0.5 to 0.8;

a flame retardant;

a drip preventing agent; and an antioxidant, wherein a weight ratio between a content of the low molecular weight polycarbonate resin and a content of the high molecular weight polycarbonate resin is in a range of 30:70 to 70:30, wherein a weight ratio of the content of the low molecular weight polycarbonate resin and the content of the high molecular weight polycarbonate resin is from 60 to 90 parts by weight of a total of 116.2 parts by weight of the total amount of solid content of the resin composition, wherein the low molecular weight polycarbonate and high molecular weight polycarbonate are each at east one selected from the group consisting of an aromatic polycarbonate resin, bisphenol A-type polycarbonate, bisphenol S-type polycarbonate, biphenyl-type polycarbonate, and an aromatic homopolycarbonate, resin or a copolycarbonate resin obtainable by reacting an aromatic bivalent phenol compound and phosgene or carbonic diester, wherein a weight ratio of the flame retardant is from 5 wt % to 15 wt % by weight with respect to the total amount of solid content of the resin composition, and wherein a weight ratio of the drip preventing agent and the antioxidant is less than 10% by weight, with respect to the total amount of solid content of the resin composition.

2. The resin composition according to claim 1, wherein a weight ratio between the content of the polyethylene terephthalate resin and a sum of the content of the low molecular weight polycarbonate resin and the content of the high molecular weight polycarbonate resin is in a range of 10:90 to 40:60.

3. The resin composition according to claim 1, wherein the weight average molecular weight of the low molecular weight polycarbonate resin is in a range of 25,000 to 35,000.

4. The resin composition according to claim 1, wherein the weight average molecular weight of the high molecular weight polycarbonate resin is in a range of 55,000 to 65,000.

5. The resin composition according to claim 1, wherein the weight ratio between the content of the low molecular weight polycarbonate resin and the content of the high molecular weight polycarbonate resin is in a range of 40:60 to 60:40.

6. The resin composition according to claim 1, wherein the intrinsic viscosity value of the polyethylene terephthalate resin is in a range of 0.6 to 0.7.

7. The resin composition according to claim 1, wherein the weight ratio between the content of the polyethylene terephthalate resin and the sum of the content of the low molecular weight polycarbonate resin and the content of the high molecular weight polycarbonate resin is in a range of 15:85 to 30:70.

8. A resin molded article that is obtained from the resin composition according to claim 1.

9. A resin molded article that is obtained from the resin composition according to claim 2.

* * * * *